Dec. 1, 1964  A. O. AUSTIN ETAL  3,159,709
CROSS CATENARY GUY STRAIN INSULATOR CONSTRUCTION
Filed April 19, 1960  2 Sheets-Sheet 1

*INVENTORS*
ARTHUR O. AUSTIN &
WILLIAM ROBERT GORMLEY
BY
ATTORNEYS

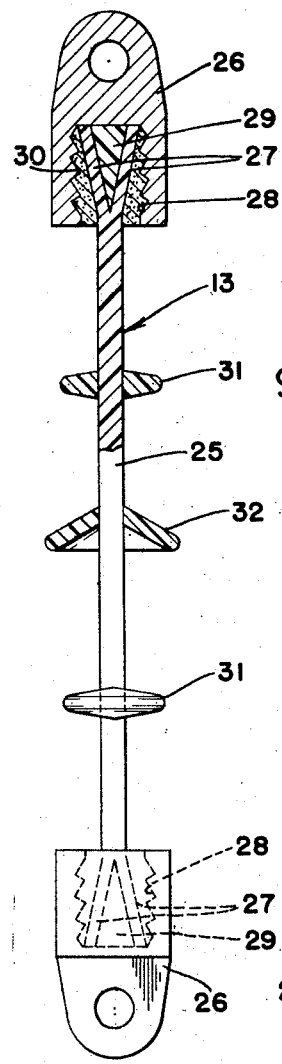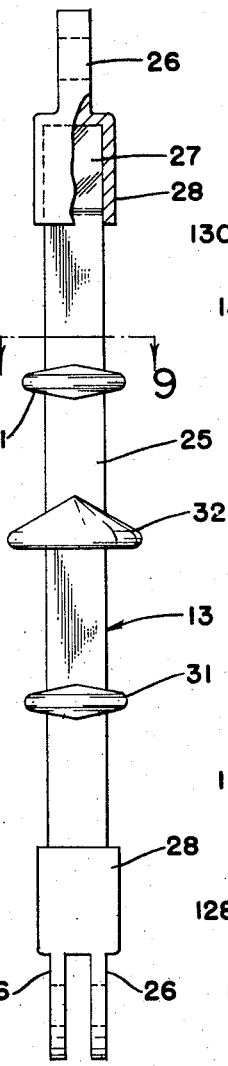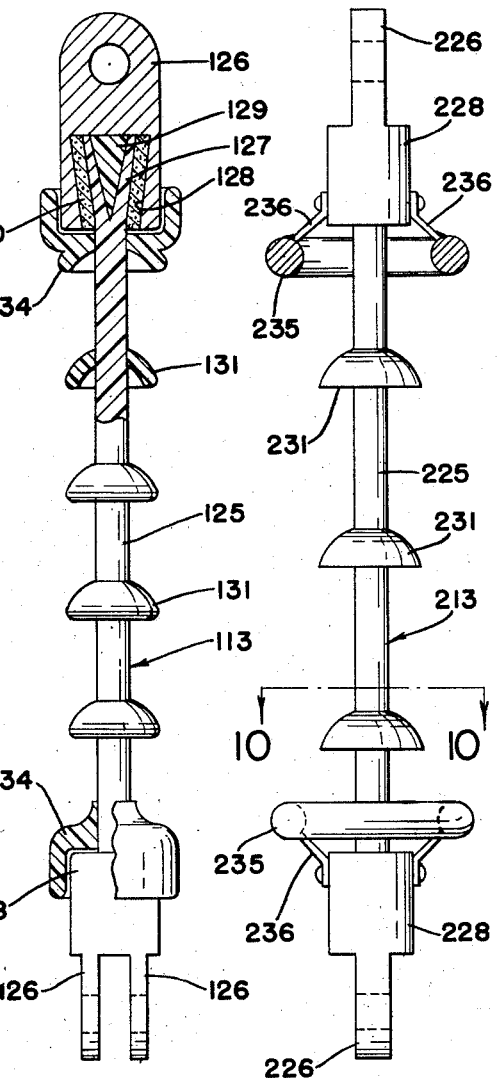

United States Patent Office 3,159,709
Patented Dec. 1, 1964

3,159,709
CROSS CATENARY GUY STRAIN INSULATOR CONSTRUCTION
Arthur O. Austin and William Robert Gormley, Barberton, Ohio, assignors to A. O. Austin, Inc., Barberton, Ohio, a corporation of Ohio
Filed Apr. 19, 1960, Ser. No. 23,251
4 Claims. (Cl. 174—45)

The invention relates generally to a suspension arrangement for supporting on towers primary insulators carrying high tension electric power lines overland. More particularly, the invention relates to a cross catenary suspension utilizing guy strain insulators to support the primary insulators from the tower.

In the transmission of power the insulator is an important factor. The reliability of the installation depends to a large extent upon the reliability hazard.

In the cross catenary type of construction the secondary insulation in line with the primary insulation has a decided advantage. This permits the number of insulators to be reduced from 50 to 60 percent of the ordinary type of construction. In the cross catenary the length of the secondary insulation is important as it greatly increases the voltage to ground which is important as it develops the flashover voltage. An arrangement which reduces the number of prime insulators, and yet increases the flashover is an advantage.

Certain prior cross catenary suspension constructions utilized cables or other metal linear elements to connect the primary insulators carrying power lines to the sides of the tower, and thus electrically connected the insulators to ground, resulting in lower flashover voltage. It has been proposed to use insulating connections between the cables and the tower, but in such cases excessive costs were involved.

The purpose of the present invention is to provide an ungrounded multi-phase catenary arrangement by utilizing improved guy strain insulators to form that part of the catenary suspension between the sides of the tower and the primary insulators which support parallel power lines extending between the sides of the tower.

A further object is to utilize improved guy strain insulators between the primary phases as well as between the outer phases and the tower.

Another object is to provide improved damping means between the tower and catenary to restrain movement of the power lines due to weather conditions and thus tend to equalize the load between tower structures.

A still further object is to provide an improved guy strain insulator construction adapted to support the primary conductors in a multi-phase cross catenary arrangement.

These and other objects are accomplished by the parts, combinations and arrangements comprising the present invention, preferred embodiments of which are shown by way of example in the accompanying drawings and described in detail herein. Various modifications and changes in details of construction are comprehended within the scope of the invention defined in the appended claims.

In the drawings:

FIG. 5 is an enlarged view, partly in section, of one embodiment of guy strain insulator.

FIG. 6 is a side elevation thereof.

FIG. 7 is a view similar to FIG. 5 of a modified guy strain insulator.

FIG. 8 is a similar view of still another modification.

FIG. 9 is a sectional view on line 9—9 of FIG. 6.

FIG. 10 is a sectional view on line 10—10 of FIG. 8.

Figure 1:
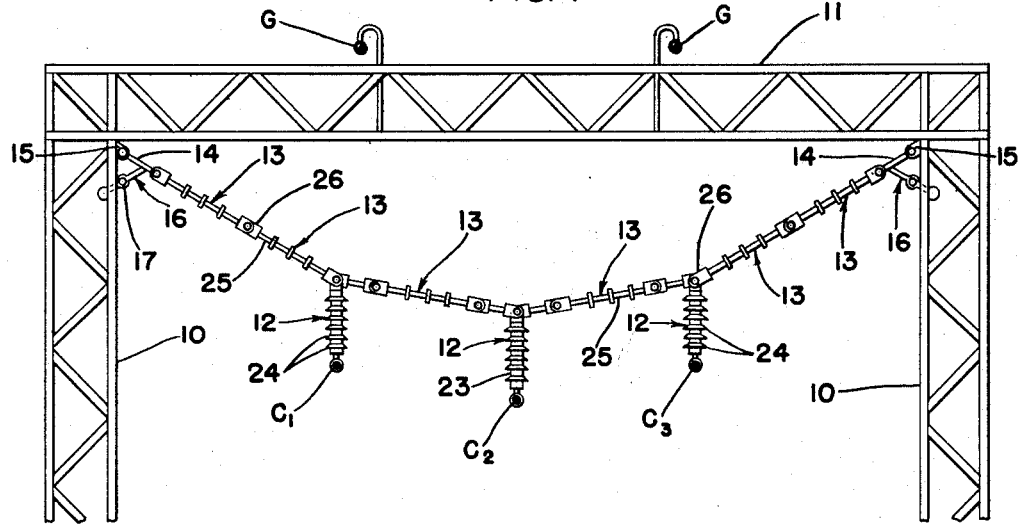
FIG. 1 is a schematic view of a lattice type tower structure having three primary insulators carrying power lines supported from the sides of the tower in a cross catenary arrangement by a series of guy strain insulators extending between the primary insulators and between the outer primary insulators and the sides of the tower.

Referring to FIG. 1, the upper part of a bridge type tower of lattice structure is shown supporting three substantially parallel power lines between the upright lattice posts 10 having their top ends connected by a truss 11. The power lines are indicated at $C_1$, $C_2$, and $C_3$ and are hung by primary insulators indicated generally at 12 from the central portion of a catenary structure connected at its ends to the upper ends of the posts. Ground cables G substantially parallelling the power lines are supported above the truss 11 in a usual manner.

The catenary structure preferably comprises a series of guy strain insulators indicated generally at 13 connected end-to-end, having links 14 connecting the end insulators to brackets 15 at the tops of the posts 10. Preferably, a friction brake 16 is applied to each link 14 for the purpose of restraining or damping swinging of the catenary structure caused by movement of the power lines due to weather conditions. Thus, the brakes tend to equalize the load between tower structures.

Figures 3, 4:
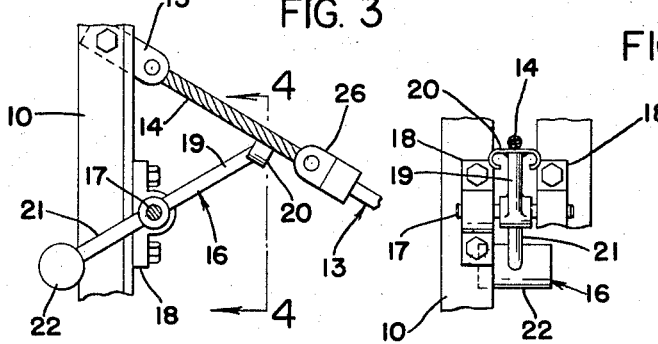
FIG. 3 is an enlarged view of one of the damping connections between the tower and the adjacent guy strain insulator.
FIG. 4 is a side elevation thereof on line 4—4 of FIG. 3.

As shown in FIGS. 3 and 4, the brake 16 may have a shaft 17 pivoted in bearing brackets 18 secured to the post 10. A bar 19 inclines upwardly from the shaft 17 and preferably has a brake shoe 20 on its outer end frictionally engaging the link 14, and a bar 21 includes downwardly from the opposite side of the shaft. A counterweight 22 on the end of bar 21 holds the shoe 20 against the link 14.

The primary insulators 12 may be sleeve type insulators of suitable construction having an outer dielectric sleeve within which an inner stress link of insulating material extends axially and connects the load-bearing ends of the insulator, the upper end being attached to a support and the lower one to the power line. Preferably, the outer sleeve 23 has a series of annular drip flanges 24 thereon to conduct moisture away from the sleeve. Obviously, the construction of the primary insulators may vary, one such type being shown in the U.S. patent to Austin No. 2,175,336.

Referring to FIGS. 5 and 6, the guy strain insulators 13 may comprise a stress rod 25 of insulating or dielectric material of high tensile strength, such as fiber glass or other reinforced plastic material, and having perforated connecting ears 26 at its ends. Preferably, the rods are rectangular in cross section and there is a single ear at one end and a pair of spaced ears at the other end for pivotal connection with the single ear of the adjoining insulator.

As shown in FIG. 5, a strong joint may be made between the rod 25 and the ears 26 by providing divergent split portions 27 on the ends of the rod received in sockets 28 at the bases of the ears, and the sockets are preferably serrated internally. The split portions 27 may be filled with a solid synthetic resin 29, and the like, and the space within the socket around the rod is filled with cast insulated Portland cement indicated at 30. Hence, when the rod 25 is under tension, the ends are held in the sockets 28 by the cement under compression.

The annular flanges 31 and 32 are of insulating material and may assume various shapes, preferably being secured to the rod 25 by a waterproof cement or bonding agent, at desired intervals. In the case of the flange 32, the entire hollow underside may be filled with cement. The flanges 31 and 32 serve to direct moisture away from the bar.

The guy strain insulator 113 shown in FIG. 7 embodies a stress rod 125 of circular cross section, having hollow divergent ends 127 received within internally tapered sockets 128 at the bases of ears 126. The hollow ends 127 are preferably filled with synthetic resin 129, and the space around the ends 127 within the sockets 128 is filled with insulated Portland cement 130. The drip flanges 131 of insulating material are preferably secured by a bonding agent to the rod 125 at suitable intervals.

The collars 134 of insulating material are provided around the rod 125 and the adjacent portions of the sockets 128 to substantially prevent arcing between the sockets at opposite ends of the rod.

In the form of guy strain insulator 213 shown in FIG. 8, the rod 225 may also be of circular cross section with hollow divergent ends secured in the sockets 228 in a manner similar to the form of FIG. 7. The drip flanges 231 are also similar to those in FIG. 7. Instead of the insulating collars 134, metal grading or repression rings 235 are secured to the sockets 228 by bracket arms 236, and surround the adjacent portions of the rod 225, being radially spaced therefrom. The grading rings serve to reduce the flashover between the ends, and space the arcing radially outward of the drip flanges 231. In this embodiment single attaching ears 226 are provided at the outer ends of the sockets, although the single and double ears are interchangeable in all forms.

Figure 2:
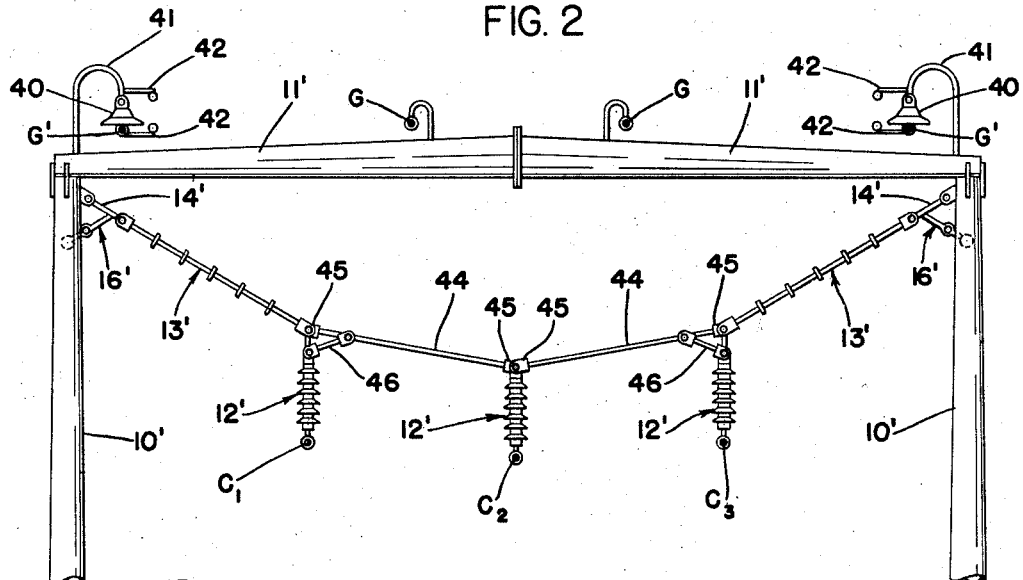
FIG. 2 is a similar view of a modified arrangement showing a somewhat different tower structure having three primary insulators, with cables between the primary insulators and guy strain insulators connecting the outer primary insulators to the sides of the tower.

In the modified cross catenary structure shown in FIG. 2, the upright posts 10' may be tubular steel posts and the cross member may comprise two steel tapered tubular members 11' secured together at their larger ends and forming a tubular beam having its outer ends secured to and supported on the upper ends of the posts. The usual ground cables G are carried on the central portion of the beam. Insulated ground cables G' are also carried above the ends of the cross member by bell-type insulators 40 suspended from gooseneck supports 41. A spark gap may be provided between the ground wire G' and the support 41 by terminal conductors 42. These insulated ground supports reduce power loss.

The catenary structure in FIG. 2 preferably comprises a single guy strain insulator 13' pivotally connecting each of the links 14' to the primary insulators 12' carrying the lines $C_1$ and $C_3$. The strain insulators 13' are substantially longer than the insulators 13, 113 and 213, but otherwise may be of the same construction. The tower connecting links 14' and friction brakes 16' may also be the same or similar construction as links 14 and brakes 16, respectively.

The upper end of the central phase primary insulator 12' carrying line $C_2$ is connected to the inner ends of the strain insulators 13' by rigid insulator rods 44 having attaching ears 45 at both ends, one pivotally connected to the central primary insulator and the other pivotally connected to the inner end of the strain insulator 13'. Stabilizer struts 46 and the like may extend angularly between the insulator rods 44 and the tops of the outer primary insulators carrying lines $C_1$ and $C_3$ to aid in maintaining the parallel spacing of the power lines due to misalignment of successive towers.

Both forms of cross catenary construction shown in FIGS. 1 and 2 provide a novel ungrounded multi-phase arrangement using the improved guy strain insulators shown in FIGS. 5-10 to suspend the primary insulators carrying the power lines.

What is claimed is:

1. In combination with a tower structure for supporting high tension power lines in three phase arrangement, three power lines extending through said structure, three primary insulators supporting said power lines at the lower ends of said insulators, a cross catenary support for the upper ends of said primary insulators, said support comprising flanged guy strain insulators connected at one end directly to the outer primary insulators and at their other ends to the sides of the tower, and damping means engaging links connecting the guy strain insulators to the sides of the tower to restrain movement of said power lines.

2. A cross catenary support suspending three primary insulators carrying at their lower ends three power lines in a three phase arrangement between the sides of a tower structure, said support comprising flanged guy strain insulators connected at one end directly to the upper ends of the outer primary insulators and at their other ends to the sides of the tower structure, and damping means engaging links connecting the guy strain insulators to the sides of the tower to restrain movement of said power lines.

3. In combination with a tower structure for supporting high tension power lines in three phase arrangement, three power lines extending through said structure, three primary insulators supporting said power lines at the lower ends of said insulators, a cross catenary support for the upper ends of said primary insulators, said support comprising guy strain insulators connecting the primary insulators to each other and additional guy strain insulators connected at one end directly to the outer primary insulators and at their other ends to links attached to the tower, and friction brake means engaging said links to restrain movement of said cross catenary support and said power lines.

4. In combination with a tower structure for supporting high tension power lines in three phase arrangement, three power lines extending through said structure, three primary insulators supporting said power lines at the lower ends of said insulators, a cross catenary support for the upper ends of said primary insulators, said support comprising guy strain insulators connecting the primary insulators to each other and additional guy strain insulators connected at one end directly to the outer primary insulators and at their other ends to links attached to the tower, and brake shoes frictionally engaging said links, said brake shoes attached at one end of bars pivotally mounted on said tower and having counterweights at the second ends thereof holding said shoes against said links to restrain movement of said cross catenary.

References Cited in the file of this patent

UNITED STATES PATENTS

| 1,139,487 | Cangia | May 18, 1915 |
| 1,502,829 | Kempton | July 29, 1924 |
| 1,616,931 | Thomas | Feb. 8, 1927 |
| 2,306,359 | Sheadel et al. | Dec. 22, 1942 |
| 2,436,089 | Birch | Feb. 17, 1948 |
| 2,609,088 | McIbried | Sept. 2, 1952 |
| 2,732,423 | Morrison | Jan. 24, 1956 |
| 2,884,479 | Fiero et al. | Apr. 28, 1959 |
| 2,889,397 | Smalley | June 2, 1959 |
| 2,907,811 | Mason | Oct. 6, 1959 |
| 3,002,043 | Jenner et al | Sept. 26, 1961 |

FOREIGN PATENTS

| 384,526 | France | Feb. 6, 1908 |
| 517,627 | France | Dec. 20, 1920 |
| 1,011,291 | France | Apr. 2, 1952 |
| 684,740 | Germany | Dec. 4, 1939 |
| 775,112 | Great Britain | May 22, 1957 |